United States Patent [19]
Man

[11] Patent Number: 5,783,281
[45] Date of Patent: Jul. 21, 1998

[54] APERTURED DISPLAY BOARD

[76] Inventor: Erik Man, 1707 E. Weber Dr. #6, Tempe, Ariz. 85281

[21] Appl. No.: 500,484

[22] Filed: Jul. 10, 1995

[51] Int. Cl.[6] .................................. G09F 7/06; B32B 3/24
[52] U.S. Cl. ........................ 428/138; 428/126; 428/204; 428/99; 40/622
[58] Field of Search ........................... 428/138, 126, 428/204, 99; 40/622

[56] References Cited

U.S. PATENT DOCUMENTS

| | | | |
|---|---|---|---|
| 1,035,153 | 8/1912 | Candy | 40/622 |
| 2,121,898 | 6/1938 | Young | 40/143 |
| 2,513,239 | 6/1950 | Hatchett | 40/124 |
| 2,746,189 | 5/1956 | Bass | 40/143 |
| 3,859,161 | 1/1975 | Mcleod | 428/126 |
| 3,999,504 | 12/1976 | Kearse | 116/121 |
| 4,208,458 | 6/1980 | Wilson, Jr. | 428/126 |
| 4,282,824 | 8/1981 | Lafferty | 116/308 |
| 4,495,233 | 1/1985 | Bussehi | 428/126 |
| 4,641,726 | 2/1987 | Fearon et al. | 181/292 |
| 4,719,730 | 1/1988 | Winkowski | 52/238.1 |
| 4,788,784 | 12/1988 | Templin | 40/657 |
| 5,169,702 | 12/1992 | Schell | 428/126 |
| 5,295,342 | 3/1994 | Roche et al. | 52/764 |
| 5,301,477 | 4/1994 | Rellinger et al. | 52/36.1 |
| 5,458,938 | 10/1995 | Nygard et al. | 428/40 |

*Primary Examiner*—William Watkins
*Attorney, Agent, or Firm*—Cahill, Sutton & Thomas P.L.C.

[57] ABSTRACT

An apertured cover defines pin penetrable locations for temporarily posting notices, indicia, and the like. A pin receiving and gripping the substrate adjacent the back surface of the cover retains any pins penetrably engaging the apertures in the cover. A hard backing sheet disposed adjacent the rear face of the substrate protects the substrate. Folded panels of the cover retain the substrate and the backing sheet in fixed relationship with one another to form a unitary structure and protect the edges of the substrate.

3 Claims, 1 Drawing Sheet

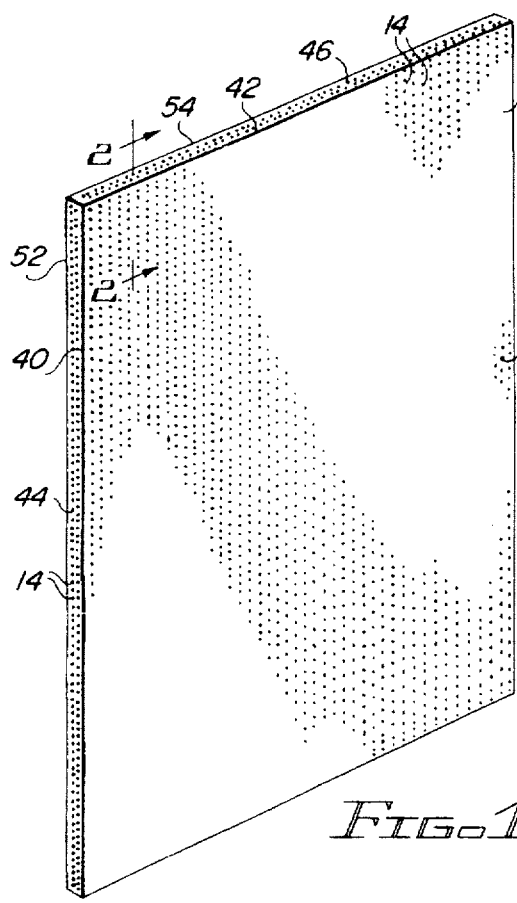
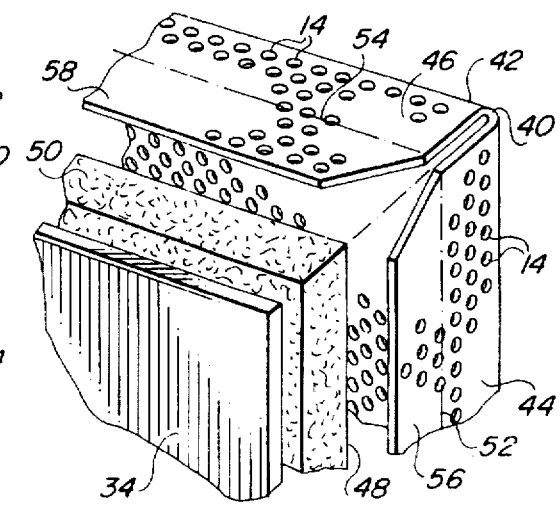
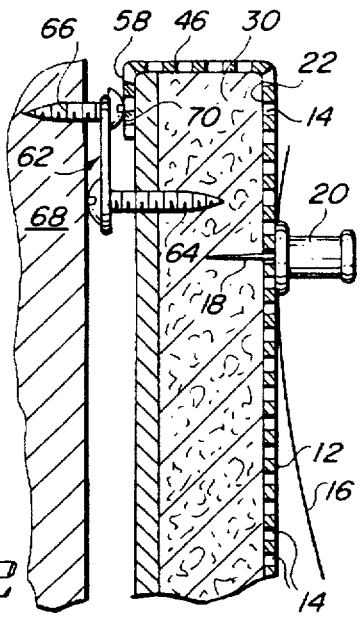
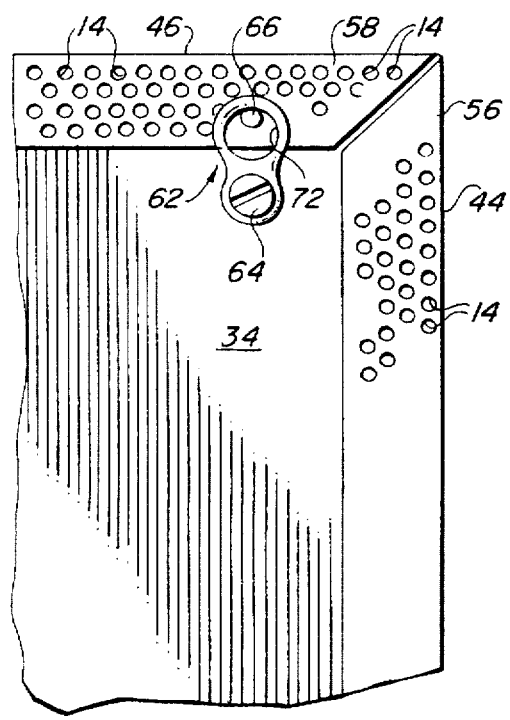
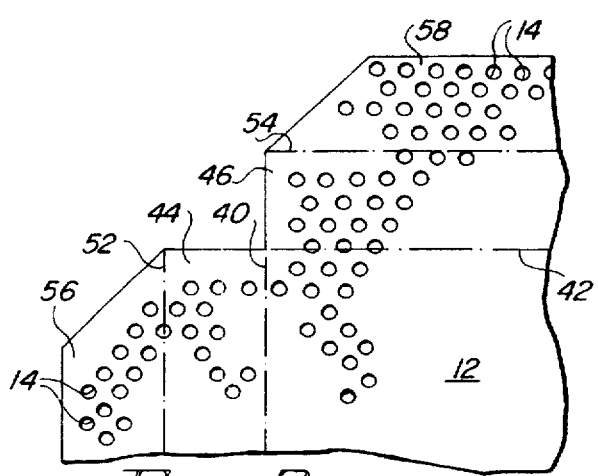

APERTURED DISPLAY BOARD

BACKGROUND OF THE INVENTION

1. Field of the Invention

The present invention relates to display boards and, more particularly, to apertured display boards for retainingly receiving pins supporting notes, indicia, and the like.

2. Description of Related Art

Display boards embodying a thin sheet of cork for receiving pins to retain notices and the like in place upon the board have been in use for decades. These corkboards serve their purpose very well provided that the thickness of the sheet of cork is sufficient to accommodate a pin depth adequate for the weight or loads imposed. Because of the expense of sheet cork, presently available corkboards provide insufficient penetrable depth or are too expensive for general use purposes. Display boards or bulletin boards having an exposed sheet of fiberboard have been used. The surface of such fiberboard is readily gouged, scored, crushed or otherwise damaged by accident or simply inattention during mounting or dismounting of pins or other devices for bearing indicia or for supporting elements.

Numerous apertured boards for receiving supporting elements having hooks or bent legs penetrably engaging one or more of the apertures and bearing against the rear surface of the board have been available for a period of years. Boards of this type, sometimes referred to as pegboards, are usually used as part of a display rack in a store or other such facility. The hardness of the board essentially precludes the use of supporting elements other than the type specifically configured to disengagably engage the existing apertures and rear surface. Display boards having rows and/or columns of slots for grippingly engaging elements placed therein have also been used; usually boards of this type are intended to be used with specifically configured alphanumerics.

SUMMARY OF THE INVENTION

An apertured or perforated cover is placed adjacent a sheet of fiberboard of a density and resiliency to permit penetration, retention and removal of pins. A rear sheet of relatively hard material is placed adjacent the rear surface of the fiberboard to protect it against abuses incurred through handling of the board. The cover protects the fiberboard against damage from normally expected abuses attendant use of a display board to preserve and enhance the useful life of the display board. The plurality of apertures, being sized to readily accommodate penetration of the pins, and located in a relatively dense pattern permit great latitude in choice of pin placement. By having the apertures arranged in a geometric pattern, such as alternatively offset rows and columns, alignment of a series of notices, indicia, and the like is readily achieved.

It is therefore a primarily object of the present invention to provide a pin supporting display board for posting notices, indicia, and the like.

Another object of the present invention is to provide a display board having an apertured cover to protect and preserve an underlying pin retaining substrate.

Still another object of the present invention is to provide a robust display board for receiving pins to post notices, indicia, and the like.

Yet another object of the present invention is to provide a pattern of pin penetrating apertures for a display board.

A further object of the present invention is to provide a pin gripping fiberboard substrate encapsulated within a pin penetrable apertured cover and a hard backing sheet.

A still further object of the present invention is to provide a metallic apertured cover for a pin receiving and gripping substrate to permit posting of notices, indicia, and the like.

A yet further object of the present invention is to provide an apertured cover extending across and bent about the perimeter of a fiberboard substrate for receiving and retaining pins penetrably engaged with the apertures of the cover.

These and other objects of the present invention will become apparent to those skilled in the art as the description thereof proceeds.

BRIEF DESCRIPTION OF THE DRAWINGS

The present invention will be described with greater specificity with reference to the following drawings, in which:

FIG. 1 is a three-quarter perspective view of the display board;

FIG. 2 is a partial cross-sectional view taken along lines 2—2, as shown in FIG. 1;

FIG. 3 illustrates a corner of the cover prior to folding same over the perimeter of an adjacent fiberboard substrate;

FIG. 4 is a detailed view illustrating one corner of the three primary elements forming the present invention; and FIG. 5 illustrates a representative location of a mounting for supporting the display board.

DETAILED DESCRIPTION OF THE PREFERRED EMBODIMENT

Referring jointly to FIGS. 1 and 2, there is illustrated a display board 10 having a perforated cover 12. The cover includes a plurality of apertures 14. Preferably, these apertures are arranged in a pattern; for example, a plurality of alternately offset columns and rows of apertures 14. Each of these apertures is of a diameter sufficient to permit penetrable engagement with a pin of the type to be used to support notices 16, indicia, or the like. As particularly illustrated in FIG. 2, the pin may be of the type having a prong 18 extending from a cylindrical manually grippable element 20. Standard pins, T-pins, or conventional thumbtacks may also be used.

A fiberboard substrate 30 is disposed adjacent inner surface 22 of cover 12 to penetrably receive and grippingly engage any pins or prongs 18 inserted through one of apertures 14. That is, the fiberboard substrate serves as a reusable retaining element for maintaining the pins or prongs in place. During use of a conventional display board supporting pins of various types, it is not unusual for a user to inadvertently laterally strike such a pin. The impact often tends to cause the pin to tilt, go askew or fall out. By employing apertured cover 12, the perimeter of each penetrated aperture serves as a support against dislodgement or reorientation of an inserted pin. Thereby, the likelihood of lost notices, indicia, and the like is significantly reduced.

A fiberboard substrate of the type suitable for grippingly receiving a pin is subject to crushing, gouging, and scratching through impact or contact with foreign objects. Cover 12 protects the front surface of the fiberboard substrate against such damage. Rear surface 32 of fiberboard substrate 30 is protected by a backing sheet 34 extending thereacross. Preferably, this backing sheet is of relatively stiff material, such as pressboard, to prevent crushing or denting of the adjacent fiberboard substrate. The backing sheet also serves to limit the penetration of the pins or prongs to the thickness of the fiberboard substrate.

To protect the edges of display board 10 and to form a cohesive unitary structure for the display board, the periphery of cover 12 may be folded, as particularly illustrated in FIGS. 2, 3, and 4. By folding cover 12 along four-fold lines, of which fold lines 40 and 42 are illustrated in FIGS. 3 and 4, commensurate with the plan form of fiberboard substrate 30, panels will be placed adjacent the edges of the fiberboard substrate, of which panels 44,46 adjacent edges 48,50 are illustrated. Further fold lines are formed to define further panels juxtaposed backing sheet 32, as illustrated in FIG. 2. Of these further panels, panels 56 and 58 are illustrated in FIGS. 4 and 5. Upon folding of cover 12 about its two sets of fold lines, fiberboard substrate 30 along with backing sheet 34 are solidly retained in place and an essentially immobile and unitary structure is developed. Furthermore, the panels, such as panels 44,46 adjacent the edges of the underlying fiberboard substrate, protect the fiberboard substrate against bending, crushing and gouging during normal manipulation of the display board.

Generally, display board 10 is intended to be suspended from a wall or the like. To accommodate such mounting, an eyelet 62 may be secured at each of three corners to provide a two point suspension, whether the major dimension of the display board is to be oriented vertically or horizontally. The eyelet may be secured to backing sheet 34, and possibly fiberboard substrate 30, by a screw 64. A nail or screw 66 is mounted in wall 68 to permit penetrable engagement of head 70 with aperture 72 in eyelet 62.

Preferably, cover 12 is of aluminum to provide lightweight, stiffness and robustness to the display board. Apertures 14 may be on the order of 1/32nd of an inch in diameter, or in the range of 0.5 to 1.5 millimeters in diameter, to accommodate a range of pins or prongs to be inserted therethrough. Furthermore, the aluminum cover is readily folded along the fold lines by use of a brake or the like.

The aluminum may be left in its natural silvery colored state or it may be painted. Preferably, the underlying surface of fiberboard substrate 30 includes indicia, such as a contrasting color, to more clearly delineate the location of each of apertures 14. For example, if the aluminum is left in its natural color state, the underlying surface of the fiberboard substrate may be painted black so that each of the apertures is readily visibly detectable.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A display board for removably retaining inserted pins supporting notices, and indicia, said display board comprising in combination:

(a) a substrate for receiving and removably gripping each inserted pin, said substrate including a front surface, a rear surface and a plurality of straight edges disposed about the perimeter of said front surface and interconnecting said front surface with said rear surface;

(b) a cover of impermeable material for covering said front surface of said substrate, said cover comprising a plurality of fold lines, each of said fold lines corresponding with one of the straight edges disposed about the perimeter of said front surface of said substrate, a plurality of panels delineated on one side by a respective one of said fold lines, said plurality of panels being folded adjacent the corresponding edges of said substrate, each fold line of a further plurality of fold lines delineating another side of one of said plurality of panels, a plurality of further panels extending from respective ones of said further plurality of fold lines, said plurality of further panels being folded along the respective one of said further plurality of fold lines adjacent said rear surface of said substrate, each panel of said plurality of panels having opposed ends extending perpendicularly to the respective one of said plurality of fold lines, each panel of said further plurality of panels having opposed ends extending at an angle from the respective further fold line of said plurality of further fold lines and toward one another; and (c) a plurality of discrete apertures formed in said cover for penetrably receiving inserted pins to locate the notices and indicia adjacent said cover and wherein said plurality of apertures are also disposed in said plurality of panels.

2. The display board as set forth in claim 1 including a backing sheet disposed adjacent said rear surface of said substrate and intermediate said rear surface and said further plurality of panels.

3. The display board as set forth in claim 1 including support means for dependingly supporting said display board from a supporting structure.

\* \* \* \* \*